(12) United States Patent
Gu et al.

(10) Patent No.: US 11,804,782 B2
(45) Date of Patent: Oct. 31, 2023

(54) ACTIVE-CLAMP CURRENT-FED PUSH-PULL CONVERTER FOR BIDIRECTIONAL POWER TRANSFER

(71) Applicant: Analog Devices, Inc., Wilmington, DE (US)

(72) Inventors: Wei Gu, San Jose, CA (US); Siyuan Chen, Santa Clara, CA (US); Yuchen Yang, San Jose, CA (US)

(73) Assignee: Analog Devices, Inc., Wilmington, MA (US)

( * ) Notice: Subject to any disclaimer, the term of this patent is extended or adjusted under 35 U.S.C. 154(b) by 0 days.

(21) Appl. No.: 17/587,256

(22) Filed: Jan. 28, 2022

(65) Prior Publication Data
US 2023/0246556 A1 Aug. 3, 2023

(51) Int. Cl.
*H02M 3/335* (2006.01)

(52) U.S. Cl.
CPC ... *H02M 3/33584* (2013.01); *H02M 3/33573* (2021.05); *H02M 3/33592* (2013.01)

(58) Field of Classification Search
CPC ......... H02M 3/33584; H02M 3/33573; H02M 3/33592; H02M 3/335
See application file for complete search history.

(56) References Cited

U.S. PATENT DOCUMENTS

| | | | |
|---|---|---|---|
| 6,256,214 B1 * | 7/2001 | Farrington | H02M 3/33592 363/21.06 |
| 6,278,621 B1 * | 8/2001 | Xia | H02M 3/33576 363/16 |
| 6,771,521 B1 * | 8/2004 | Xiong | H02M 3/33592 363/21.06 |
| 6,876,556 B2 | 4/2005 | Zhu et al. | |
| 7,573,731 B2 | 8/2009 | Kwon et al. | |
| 7,638,904 B2 * | 12/2009 | Shoji | H02M 3/33584 307/154 |

(Continued)

FOREIGN PATENT DOCUMENTS

| | | |
|---|---|---|
| CN | 201821266 | 5/2011 |
| CN | 102739063 | 10/2012 |

(Continued)

OTHER PUBLICATIONS

Alatai, Salah, "A Review on State-of-the-Art Power Converters: Bidirectional, Resonant, Multilevel Converters and Their Derivatives", Appl. Sci. 2021, 11, 10172, (2021), 43 pgs.

(Continued)

*Primary Examiner* — Yusef A Ahmed
(74) *Attorney, Agent, or Firm* — Schwegman Lundberg & Woessner, P.A.

(57) ABSTRACT

An apparatus including a bidirectional power converter circuit. The power converter circuit includes a primary circuit side including a plurality of primary switches, an isolation transformer, and a secondary circuit side separated from the primary circuit side by the isolation transformer. The secondary circuit side includes an inductor, a rectifier circuit coupled to the inductor and configured to receive energy from the primary circuit side and provide energy to the primary circuit side, and a clamp circuit coupled to the inductor and configured to provide a reset voltage to the inductor that prevents inductor current runaway.

16 Claims, 8 Drawing Sheets

(56) References Cited

U.S. PATENT DOCUMENTS

| | | | |
|---|---|---|---|
| 7,848,118 B2* | 12/2010 | Shimada | H02M 3/33584 363/21.02 |
| 7,911,810 B2* | 3/2011 | Shimada | H02M 3/33584 363/21.02 |
| 8,130,515 B2* | 3/2012 | Shimada | H02M 1/32 363/21.02 |
| 8,531,854 B2 | 9/2013 | Pan | |
| 8,629,661 B2* | 1/2014 | Shimada | H02M 3/33584 307/66 |
| 8,705,251 B2* | 4/2014 | Matsui | H02M 3/33584 363/16 |
| 9,065,349 B2 | 6/2015 | Chiang et al. | |
| 9,595,841 B2* | 3/2017 | Shimada | H02M 1/32 |
| 9,641,089 B2* | 5/2017 | Higaki | H02M 3/33584 |
| 10,566,909 B2* | 2/2020 | Denzner | H02M 1/08 |
| 10,938,309 B1* | 3/2021 | Malechek | H02M 3/33507 |
| 10,985,664 B1* | 4/2021 | Malechek | H02M 3/33584 |
| 11,349,401 B1* | 5/2022 | Zafarana | H02M 1/342 |
| 2003/0067794 A1* | 4/2003 | Boylan | H02M 3/33592 363/127 |
| 2006/0139823 A1* | 6/2006 | Shoji | H02M 1/34 361/56 |
| 2007/0230228 A1* | 10/2007 | Mao | H02M 3/1588 363/89 |
| 2008/0074905 A1* | 3/2008 | Moiseev | H02M 3/33584 363/20 |
| 2009/0059622 A1* | 3/2009 | Shimada | H02M 1/32 363/17 |
| 2010/0052423 A1* | 3/2010 | Shimada | H02M 3/33507 363/20 |
| 2010/0142228 A1* | 6/2010 | Yamauchi | B60L 58/20 307/77 |
| 2010/0177536 A1* | 7/2010 | Liu | H02M 3/33592 363/127 |
| 2011/0019440 A1* | 1/2011 | Shimada | H02M 1/32 363/17 |
| 2011/0128759 A1* | 6/2011 | Shimada | H02M 1/32 363/17 |
| 2014/0092639 A1* | 4/2014 | Shimada | H02M 3/33584 363/17 |
| 2015/0236596 A1* | 8/2015 | Fan | H02M 3/33507 363/17 |
| 2015/0306960 A1* | 10/2015 | Sobu | H02M 7/003 307/10.1 |
| 2015/0381075 A1* | 12/2015 | Qu | H02M 3/33576 363/132 |
| 2016/0226389 A1* | 8/2016 | Quaglino | G05F 1/468 |
| 2017/0310230 A1* | 10/2017 | Quaglino | H02M 3/33592 |
| 2019/0028035 A1* | 1/2019 | Choi | H02M 3/33573 |
| 2019/0379288 A1* | 12/2019 | Chaput | H02M 3/33584 |
| 2020/0403521 A1 | 12/2020 | Zheng et al. | |
| 2021/0119545 A1* | 4/2021 | Malechek | H02M 3/33546 |
| 2021/0305889 A1 | 9/2021 | Radic | |

FOREIGN PATENT DOCUMENTS

| | | |
|---|---|---|
| CN | 106549597 | 3/2017 |
| CN | 108471253 | 8/2018 |
| CN | 111641339 | 9/2021 |
| EP | 2991208 | 3/2016 |
| KR | 101923317 | 11/2018 |

OTHER PUBLICATIONS

Li, Wuhua, "Analysis, design and implementation of isolated bidirectional converter with winding-cross-coupled inductors for high step-up and high step-down conversion system", IET Power Electron., 7(1), (2014), 67-77.

Shi, Kai, "Power Loss Analysis of Bidirectional ACFC-SR Based Active Cell Balancing System", IFAC PapersOnLine 53-2, (2020), 12402-12409.

"TI Designs: TIDA-00951, 2-kW, 48- to 400-V, >93% Efficiency, Isolated Bidirectional DC-DC Converter Reference Design for UPS", Texas Instruments Incorporated, (Jun. 1017), 31 pgs.

Kutschak, Matteo-Alessandro, et al., "3300 W 54 V bi-directional phase-shift full-bridge with 600 V CoolMOS CFD7 and XMC", Infineon Technologies AG, (2019), 44 pgs.

* cited by examiner

ACTIVE-CLAMP CURRENT-FED PUSH-PULL CONVERTER FOR BIDIRECTIONAL POWER TRANSFER

BACKGROUND

Electronic power systems typically consist of one or more power converters controlled by integrated circuits. The power converters receive an electrical input having an input magnitude, frequency, and/or phase at an input side and convert the electrical input to an electrical output at an output side having a magnitude, frequency, and/or phase. An isolated bidirectional power converter includes an isolation transformer to electrically isolate the power converter output stage or secondary side from the input stage or primary side by arranging the isolation transformer between the primary side and the secondary side. For conversion of a low voltage to a high voltage, one approach includes a bulky capacitor charger with a capacitor of a few milli-Farads (mF) connected to an input of an inverter. Another approach is a phase shift full bridge isolated topology for high Vin to low Vout conversion, but it has a startup issue for the reverse low Voltage to high Voltage application.

OVERVIEW

This document relates generally to switching power converters and methods of their operation. An apparatus example includes a bidirectional power converter circuit. The power converter circuit includes a primary circuit side including a plurality of primary switches, an isolation transformer, and a secondary circuit side separated from the primary circuit side by the isolation transformer. The secondary circuit side includes an inductor, a rectifier circuit coupled to the inductor and configured to receive energy from the primary circuit side and provide energy to the primary circuit side, and a clamp circuit coupled to the inductor and configured to provide a reset voltage to the inductor that prevents inductor current runaway.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 3:
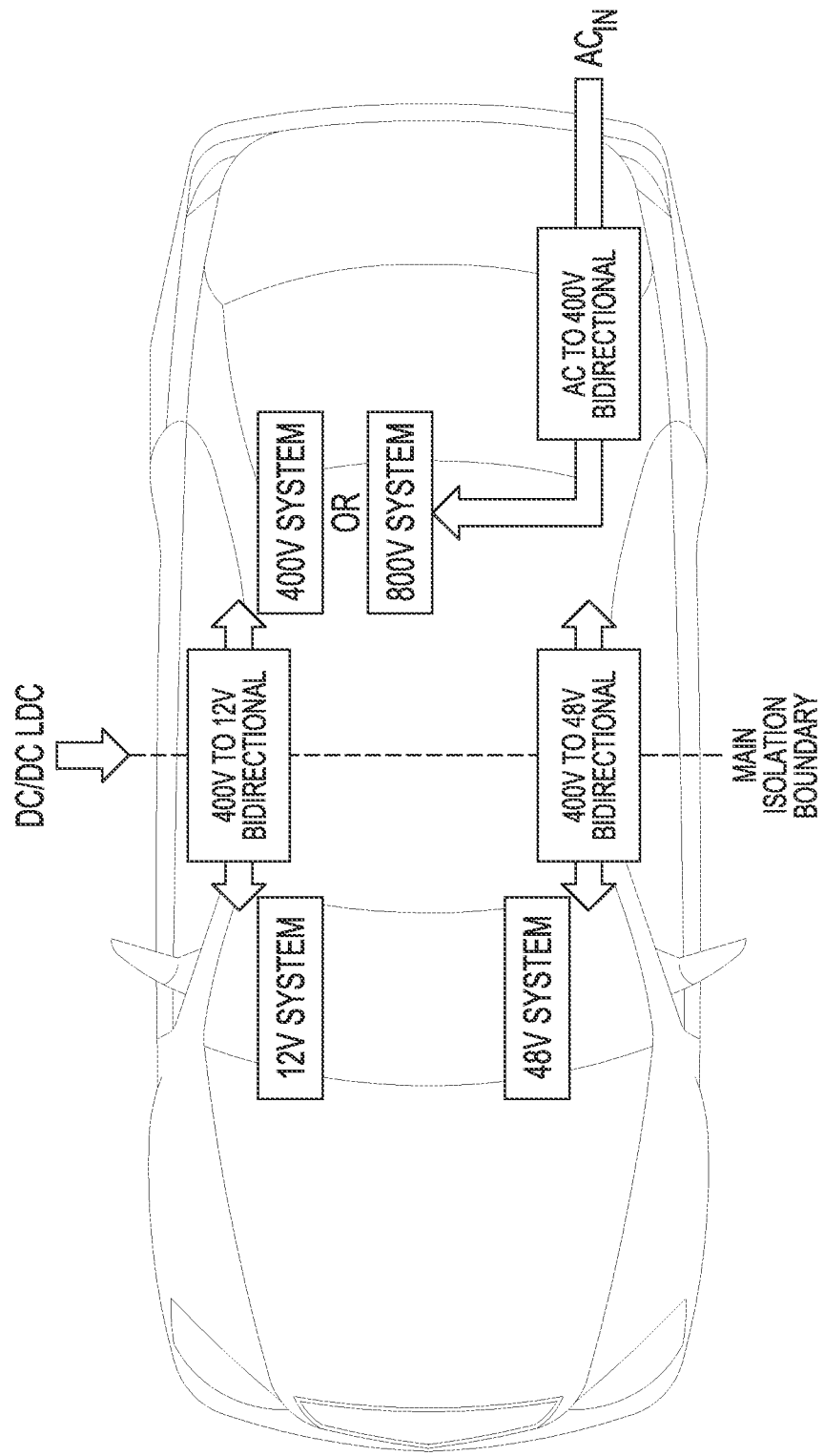
FIG. 3 is an illustration of an electric vehicle indicating a high voltage domain of the vehicle and a lower voltage domain of the vehicle.

FIG. 3 is an illustration of an electric vehicle indicating a high voltage domain (e.g., 400 Volts (V) or 800V) and a lower voltage domain (e.g., 12V or 48V). In electric vehicles, a direct current-to-direct current bidirectional converter (DC/DC converter) is used to transfer energy from a high voltage battery pack to a low voltage lead-acid battery. Because the converter is bidirectional, the converter can also transfer energy from the low voltage lead-acid battery to the high voltage bulky cap on the high voltage battery pack side or provide high voltage when the high voltage battery is not connected or otherwise absent from the circuit.

Figure 2:
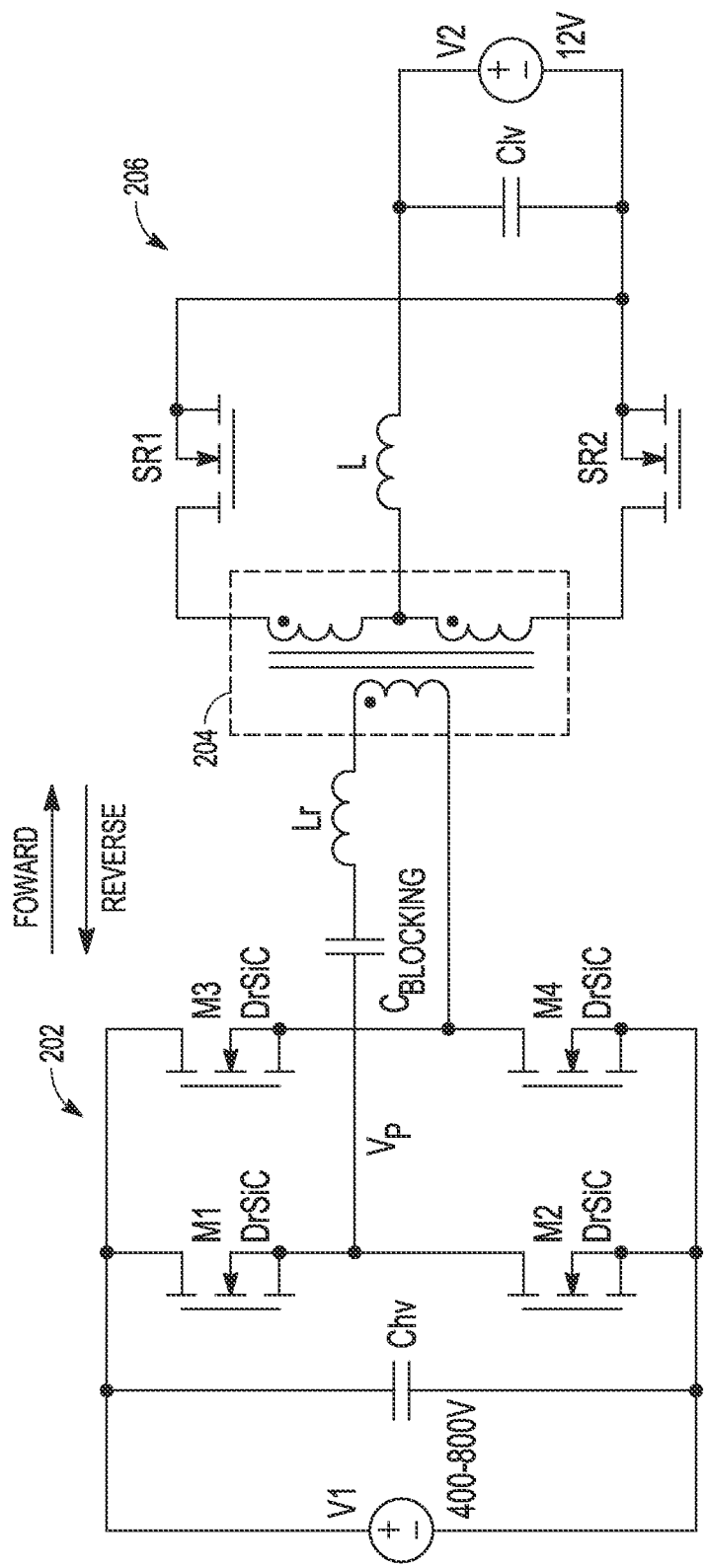
FIG. 2 is a block diagram of another example of an isolated bidirectional power converter.

FIG. 2 is a circuit schematic of an example of an isolated bidirectional power converter. The power converter includes a primary circuit side 202, an isolation transformer 204, and a secondary circuit side 206. The primary circuit side 202 is connected to a supply rail having voltage $V_1$ and the secondary circuit side is connected to a supply rail having voltage $V_2$. Typically, $V_1$ (400V-800V) is greater than $V_2$ (12V). The primary circuit side 202 has a phase shift full bridge converter topology and includes capacitor $C_{HV}$ and primary switches M1-M4. The secondary circuit side 206 includes a filter capacitor $C_{LV}$, an inductor L, and a full wave rectifier circuit that includes synchronous rectifiers implemented with field effect transistors (FETs) SR1 and SR2.

The power converter is bidirectional and can convert the higher voltage $V_1$ to the lower voltage $V_2$ in the forward direction, and can convert the lower voltage $V_2$ to the higher voltage $V_1$ in the reverse direction. However, it is not always straightforward to use the phase shift full bridge topology in the reverse direction to convert low voltage to high voltage under certain conditions. One issue is that in the beginning of the startup when the high voltage rail is smaller than low voltage rail, the inductor L cannot reach a volt-second balance and thus inductor current runaway occurs. The runaway inductor current can cause damage to components of the power converter.

Figure 1:
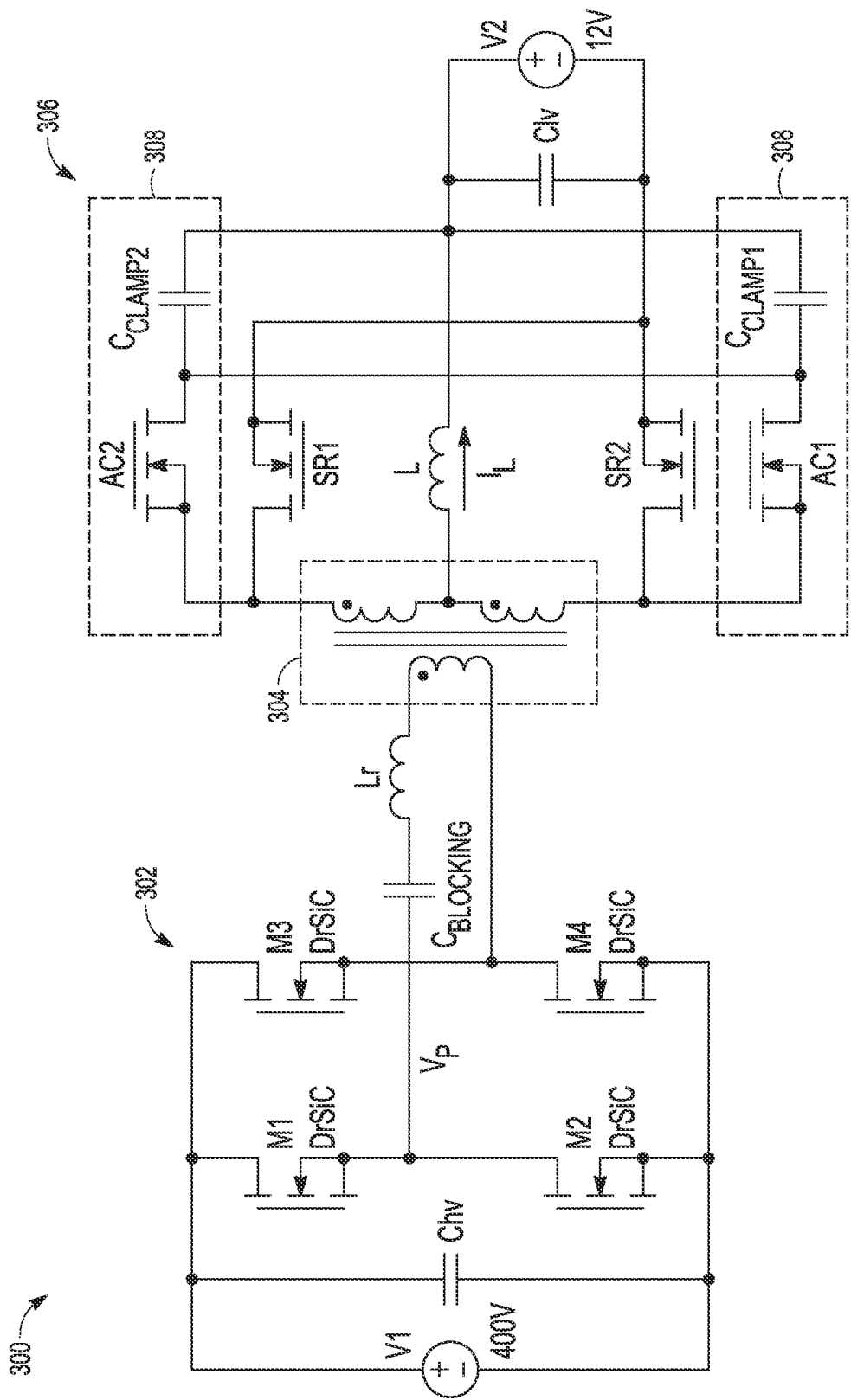
FIG. 1 is a circuit schematic of an example of an isolated bidirectional power converter.

FIG. 1 is a circuit schematic of another example of a power converter. The power converter circuit 300 includes a primary circuit side 302, an isolation transformer 304, and a secondary circuit side 306. The circuit example of FIG. 1 also includes a clamp circuit 308 connected to the rectifier circuit of the secondary circuit side 306. The clamp circuit 308 provides a reset voltage to the inductor L that prevents inductor current runaway.

The rectifier circuit operates by having the first synchronous rectifier SR1 "ON" and the second synchronous rectifier SR2 "OFF" for the first half of the switching period, and first synchronous rectifier SR1 "OFF" and the second synchronous rectifier SR2 "ON" for the second half of the switching period. The clamp circuit 308 includes clamp switches AC1 and AC2, and clamp capacitors $C_{CLAMP1}$ and $C_{CLAMP2}$. Each of the clamp capacitors is coupled to the inductor L and to the clamp switches.

The clamp switches are clamp FETs. One clamp FET and one clamp capacitor resets the inductor L in each half of the switching period. A drain/source region of a clamp FET is connected to a source/drain region of an SR FET. The other of the source/drain region of a clamp FET is connected to a clamp capacitor. The clamp FET is on only when the SR FET is off. The clamp capacitors help to establish a voltage at the center leg of the transformer 304 that is higher than voltage $V_2$. As a result, the clamp circuit 308 establishes a volt-second balance in the inductor L.

The power converter circuit 300 can be operated in the forward direction in a buck mode in which a higher voltage $V_1$ is converted to a lower voltage $V_2$. The power converter circuit can also be operated in the reverse direction in either a boost mode in which a lower voltage $V_2$ is converted to a higher voltage $V_1/n$ (where n is the turns ratio of the transformer), or a buck mode in which $V_2$ is greater than $V_1/n$. Without the clamp circuit 308, the center leg of the transformer 304 would be less than the $V_2$ when operating in the reverse direction leading to runaway inductor current.

Figure 4:
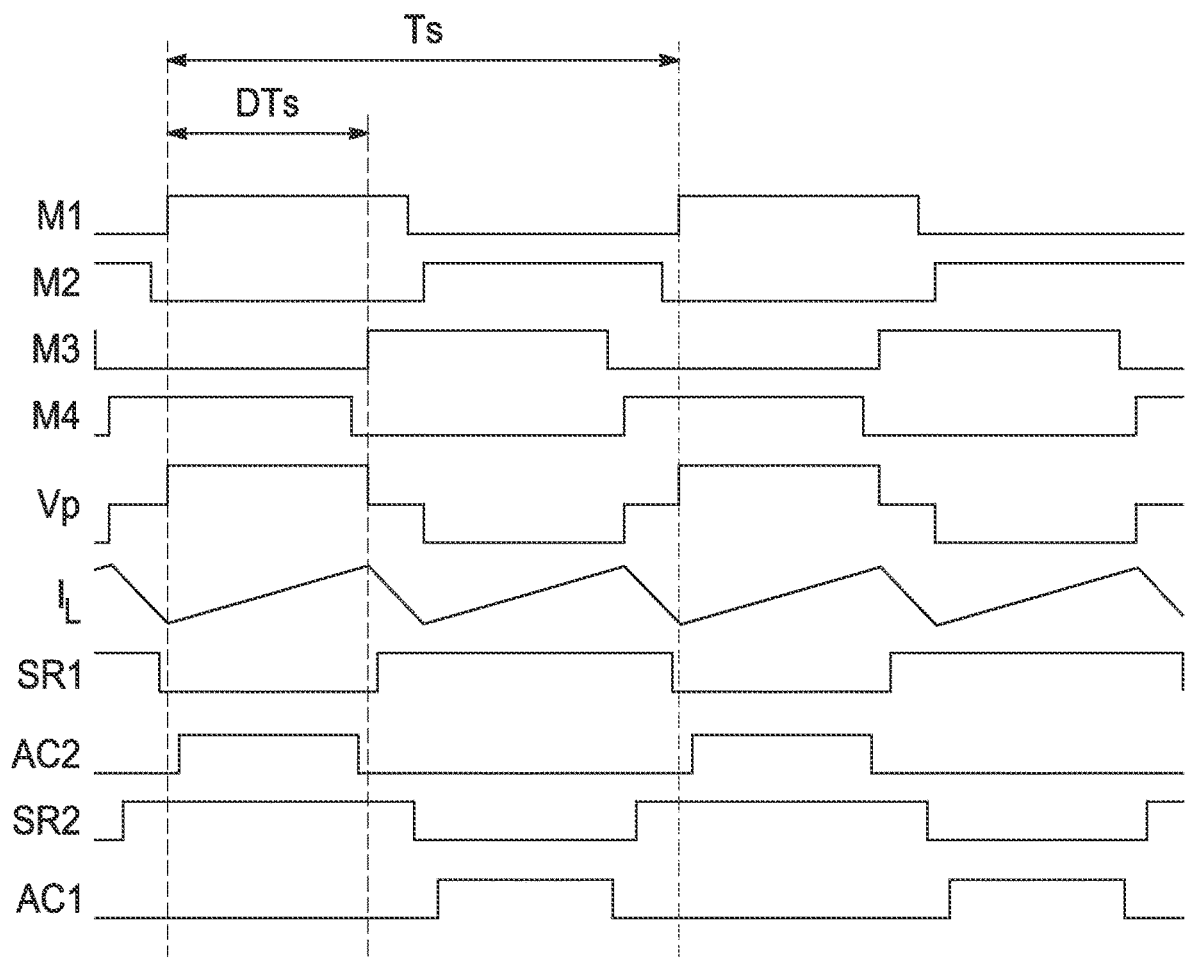
FIG. 4 is an illustration of waveforms showing operation of the power converter circuit of FIG. 1 in the forward direction.

FIG. 4 is an illustration of waveforms showing operation of the power converter circuit 300 in the forward direction. The waveforms include the control signals for FETs M1-M4, SR1, SR2, AC1, AC2. Waveform $I_L$ is the inductor current. The $I_L$ waveform shows the duty cycling (DTs) of the charging of the inductor. The output in the forward direction is $$V_2=(2D)(V_1)/n,$$

where $V_1$ is the input voltage, $V_2$ is the output voltage, n is the transformer turns ratio (n:1:1), and D is the switching duty cycle ($0<D\le1$). The maximum output voltage in the forward buck mode is $$V_{2,MAX} \text{ is } (2/n)(V_1),$$

when the duty cycle D is equal to 1.

Figure 5A:
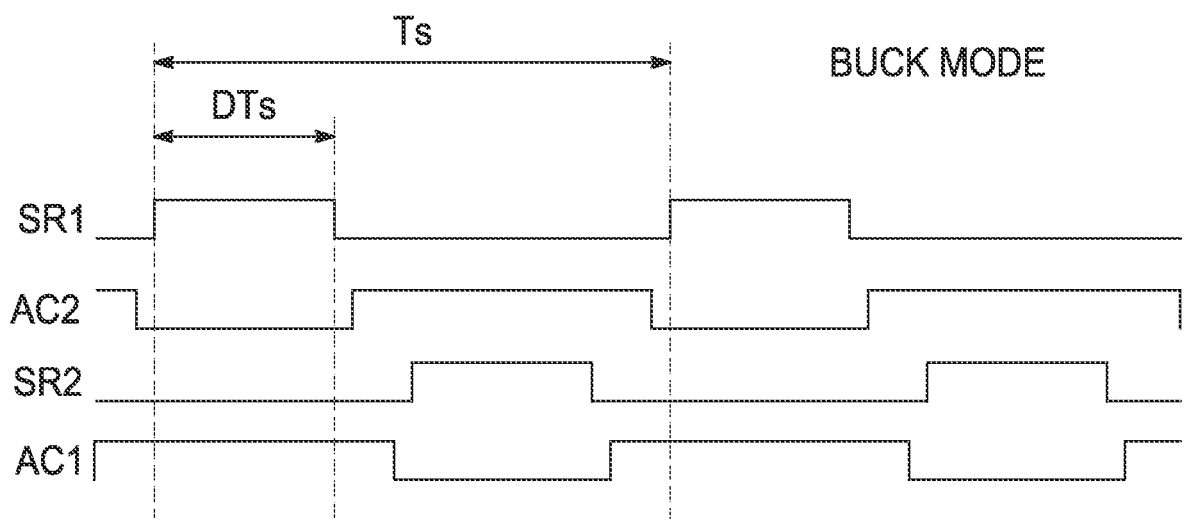
FIGS. 5A and 5B is an illustration of waveforms showing operation of the power converter circuit of FIG. 1 in the reverse direction.
Figure 5B:
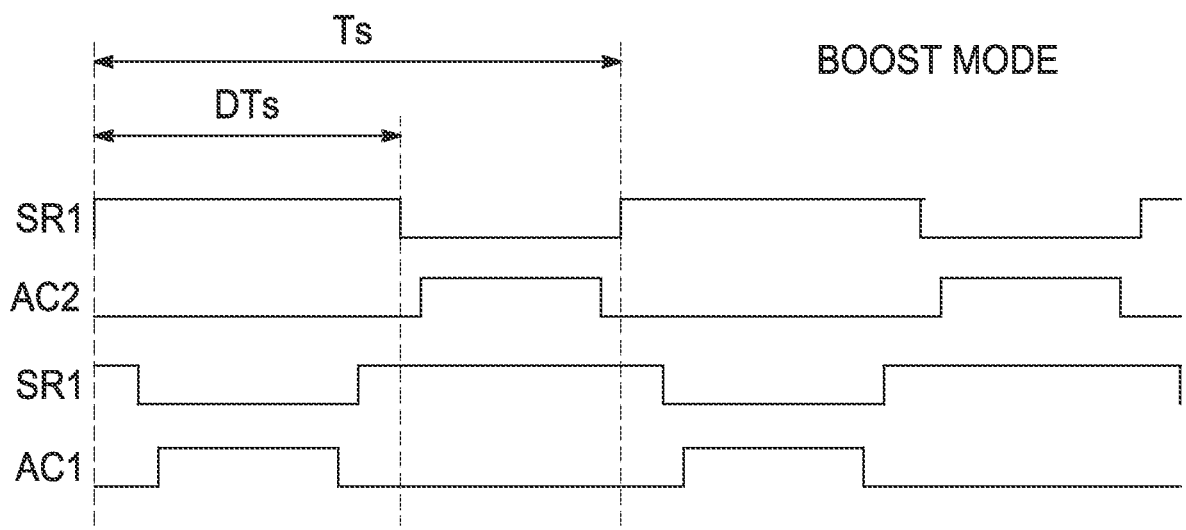

FIG. 5 is an illustration of waveforms showing operation of the power converter circuit 300 in the reverse direction. In the reverse direction, $V_2$ is the input voltage and $V_1$ is the output voltage. The power converter circuit 300 of FIG. 1 operates in a reverse buck mode with V1<V2 when the duty cycle is less than 0.5 ($D\le0.5$). The output is $$V_1=(2Dn)(V_2)$$

in the reverse buck mode. When the duty cycle increases to $D\ge0.5$ the power converter circuit transitions to a reverse boost mode V1>V2 and $$V_1=n(V_2)/(2(1-D)).$$

As explained previously herein, when the $V_1$ voltage is smaller than V2 voltage in the reverse buck mode, without the clamp circuit the inductor L cannot reach a volt-second balance and inductor current runaway occurs. The clamp circuit 308 of FIG. 1 provides active clamping of the inductor current. FIG. 5 shows that the clamp FET AC1 turns on after FET SR2 turns off and then turns off right before the FET SR2 turns on. The FET AC2 turn on after the FET SR1 turns off and then turns off right before the FET SR1 turns on. The activation signals for the AC1/SR2 FET pair are complementary and non-overlapping as are the activation signals for the AC2/SR1 FET pair.

When the SR FET of an AC/SR FET pair is ON, the inductor current $I_L$ increases and the energy stored in the inductor L and the clamp capacitors $C_{CLAMP1}$ and $C_{CLAMP2}$ goes to the output $V_2$ from the secondary circuit side 306. When the SR FET is OFF, $I_L$ decreases and the energy stored in the inductor L goes to the clamp capacitors.

Figure 6:
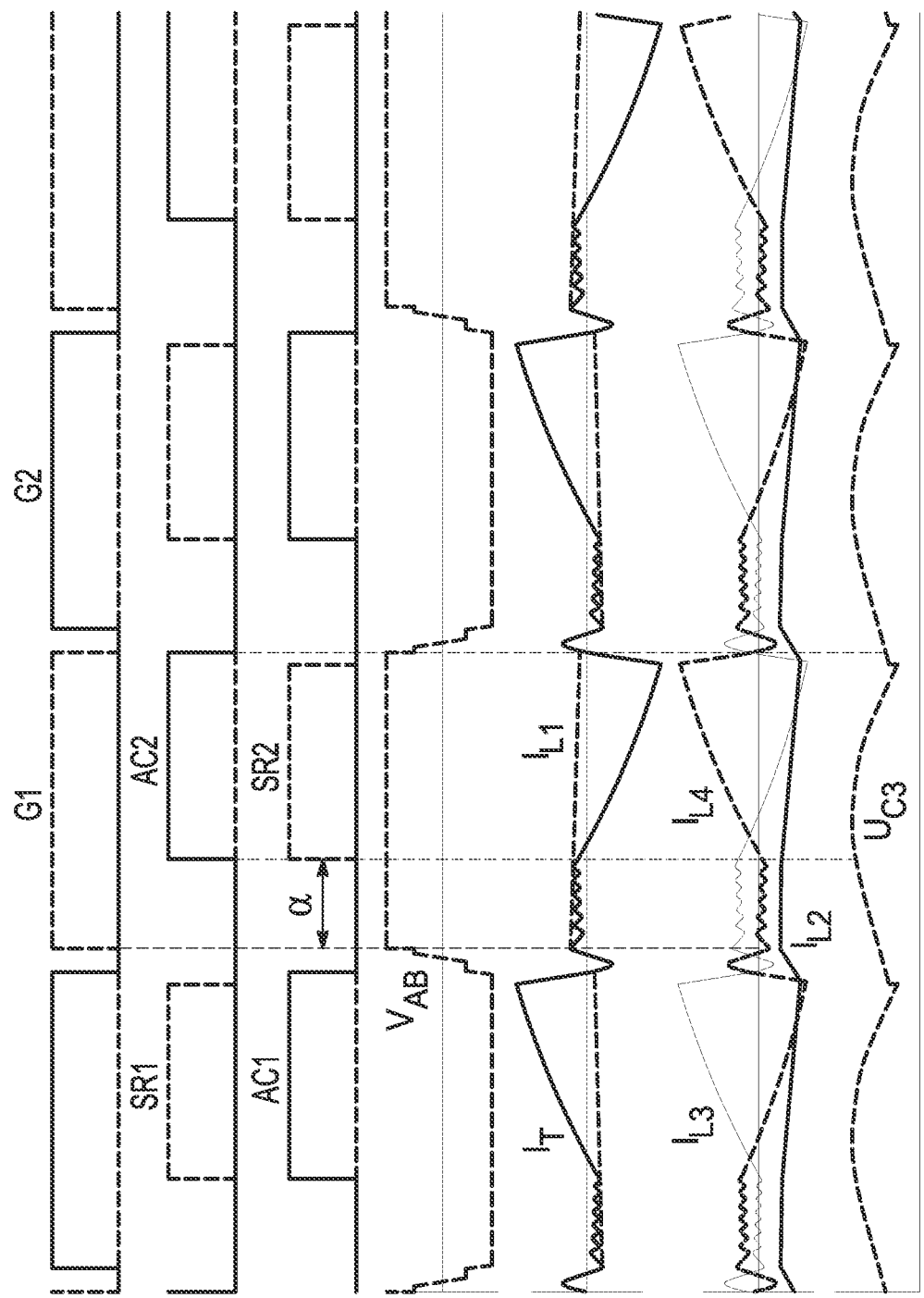
FIG. 6 shows waveforms of a circuit simulation of the power converter circuit of FIG. 1 for start-up in the reverse buck mode.
Figure 7:
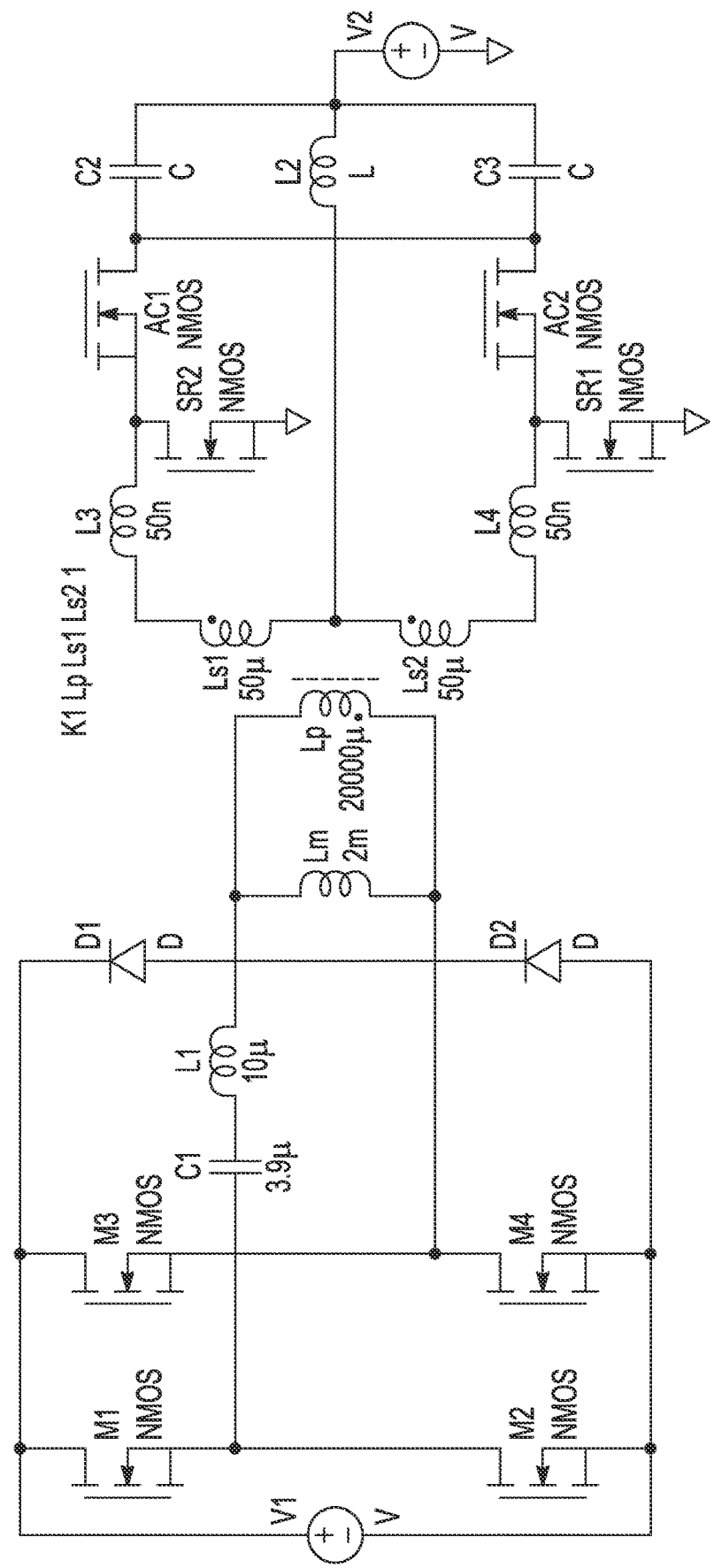
FIG. 7 is a circuit schematic used for the simulation of FIG. 6.

FIG. 6 shows waveforms of a circuit simulation of the power converter circuit 300 for start-up in the reverse buck mode. FIG. 7 is a circuit schematic used for the simulation. It can be seen in FIG. 6 that the inductor current $I_{L2}$ decreases during the switching of clamp FET AC1 and clamp FET AC2 and does not runaway during startup. The clamping capacitor coupled to clamp FET AC1 discharges during the portion of the sampling period when clamp FET AC1 is active. The clamping capacitor coupled to clamp FET AC2 charges just before clamp FET AC1 becomes active. The clamping capacitor coupled to clamp FET AC2 discharges during the portion of the sampling period when clamp FET AC2 is active. The clamping capacitor coupled to clamp FET AC1 charges just before clamp FET AC2 becomes active.

Figure 8:
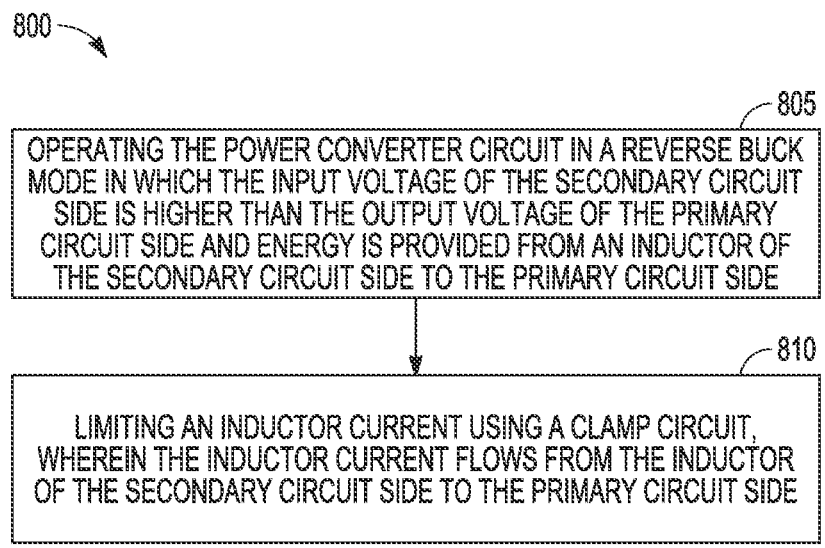
FIG. 8 is a flow diagram of an example of a method of operating a bidirectional power converter circuit.

For an overview, FIG. 8 is a flow diagram of an example of a method 800 of operating a bidirectional power converter circuit. The bidirectional power converter circuit may be a push-pull converter, such as the power converter circuit 300 in FIG. 1 for example. The power converter circuit has a primary circuit side separated from a secondary circuit side by a transformer, and the power converter circuit can be operated in a forward direction in which energy is delivered from the primary circuit side to the secondary circuit side and in a reverse direction in which energy is delivered from the secondary circuit side to the primary circuit side.

At block 805, the power converter circuit is operated in a reverse buck mode in which the input voltage of the secondary circuit side is higher than the output voltage of the primary circuit side and energy is provided from an inductor of the secondary circuit side to the primary circuit side. At block 810, the current of an inductor of the secondary circuit side is limited using a clamp circuit. The inductor current flows from the inductor of the secondary circuit side to the primary circuit side.

Clamping the inductor current prevents run away current from flowing that may cause damage to electrical circuits. The clamp circuit provides a reset voltage for the inductor when the output voltage of the higher supply rail is lower than the input voltage of the lower supply rail and lower than the regulation point during startup of the converter circuit. The active clamping when the output is below the regulation point prevents the inductor current from running away in the current-fed push-pull converter, and thus enables bidirectional power transfer without the need for pre-biasing the higher voltage rail during startup of the power converter. The active clamping can be used when the power converter circuit operates in the forward mode and in either of the reverse modes to clamp any leakage current spikes of the inductor.

ADDITIONAL DESCRIPTION AND ASPECTS

A first Aspect (Aspect 1) includes subject matter (such as a bidirectional power converter circuit) comprising a primary circuit side including a plurality of primary switches, an isolation transformer, and a secondary circuit side separated from the primary circuit side by the isolation transformer. The secondary circuit side includes an inductor, a rectifier circuit coupled to the inductor and configured to receive energy from the primary circuit side and provide energy to the primary circuit side, and a clamp circuit coupled to the inductor and configured to provide a reset voltage to the inductor that prevents inductor current runaway.

In Aspect 2, the subject matter of Aspect 1 optionally includes a rectifier circuit including a plurality of synchronous rectifier switches, and the clamp circuit includes a plurality of clamp switches and a plurality of clamp capacitors, wherein each clamp capacitor of the plurality of clamp capacitors is coupled to the clamp switches and to the inductor, and each clamp switch is coupled to a synchronous rectifier switch.

In Aspect 3, the subject matter of Aspect 2 optionally includes a primary circuit side that includes a full bridge converter circuit topology, and the rectifier circuit includes a full wave rectifier circuit topology.

In Aspect 4, the subject matter of one or any combination of Aspects 1-3 optionally includes a power converter circuit configured to operate to convert voltage in a forward mode and in a reverse mode, and when in the forward mode an input voltage of the primary circuit side is higher than an output voltage of the secondary circuit side, and in the reverse mode an input voltage of the secondary circuit side is higher or lower than the output voltage of the primary circuit side.

In Aspect 5, the subject matter of claim 4 optionally includes a rectifier circuit that includes a plurality of synchronous rectifier switches, and the clamp circuit includes at least one clamp capacitor coupled to the inductor, and when the power converter circuit operates in the reverse mode and the input voltage is higher than the output voltage, the inductor current increases and the energy stored in the inductor and the at least one clamp capacitor flows to the primary circuit side when the at least one synchronous rectifier switch is on, and the inductor current decreases and the energy stored in the inductor flows to the at least one clamp capacitor when the at least one synchronous rectifier switch is off.

In Aspect 6, the subject matter of one or any combination of Aspects 1-5 optionally includes a rectifier circuit that includes a plurality of synchronous rectifier switches, a clamp circuit that includes a first clamp field effect transistor (FET) and a second clamp FET, and the plurality of synchronous rectifier switches include first and second synchronous rectifier switches. A first source or drain region of the first clamp FET is connected to a first source or drain region of the second clamp FET, a second source or drain region of the first clamp FET is connected to the second synchronous rectifier switch, and a second source or drain region of the second clamp FET is connected to the first synchronous rectifier switch.

In Aspect 7, the subject matter of Aspect 6 optionally includes a clamp circuit includes a first clamp capacitor coupled to the first clamp FET and a second clamp capacitor coupled to the second clamp FET. The first clamp capacitor is charged from the inductor when the second clamp FET and second synchronous rectifier switch are off, and the first clamp capacitor is discharged when the first clamp FET is on, and the second clamp capacitor is charged from the inductor when the first clamp FET and the first synchronous rectifier switch are off, and the second clamp capacitor is discharged when the second clamp FET is on.

Aspect 8 includes subject matter (such as a method of operating a bidirectional power converter circuit having a primary circuit side separated from a secondary circuit side by a transformer) or can optionally be combined with one or any combination of Aspects 1-7 to include such subject matter, comprising operating the power converter circuit in a reverse buck mode in which the input voltage of the secondary circuit side is higher than the output voltage of the primary circuit side and energy is provided from an inductor of the secondary circuit side to the primary circuit side, and resetting a voltage of the inductor in the reverse buck mode to prevent runaway of inductor current of the inductor.

In Aspect 9 the subject matter of Aspect 8 optionally includes operating a rectifier circuit of the secondary circuit side having at least synchronous rectifier switch, and increasing inductor current when the at least one synchronous rectifier switch is on, and decreasing the inductor current and charging a clamp capacitor of the clamp circuit using energy stored in the inductor when the synchronous rectifier switch is off.

In Aspect 10, the subject matter of Aspect 9 optionally includes charging the clamp capacitor when a clamp switch coupled to the clamp capacitor is on and discharging the clamp capacitor when the clamp switch is off.

In Aspect 11, the subject matter of one or any combination of Aspects 8-10 optionally includes operating a rectifier circuit of the secondary circuit side having a first synchronous rectifier field effect transistor (FET) and a second synchronous rectifier FET, discharging a first clamp capacitor coupled to the inductor and charging a second clamp capacitor when the first synchronous rectifier FET is on, and discharging the second clamp capacitor and charging the first clamp capacitor when the second synchronous rectifier FET is on.

In Aspect 12, the subject matter of Aspect 11 optionally includes discharging the first clamp circuit when a first clamp FET coupled to the first clamp capacitor is on and discharging the second clamp circuit when a second clamp FET coupled to the second clamp capacitor is on. An activation signal of the first clamp FET is complementary to an activation signal of the second synchronous rectifier FET, and an activation signal of the second clamp FET is complementary to an activation signal of the first synchronous rectifier FET.

In Aspect 13, the subject matter of one or both of Aspects 11 and 12 optionally includes operating a full bridge converter circuit of the primary circuit side.

In Aspect 14, the subject matter of one or any combination of Aspect 11-13 optionally includes transitioning the power converter circuit from a reverse buck mode to a reverse boost mode by changing the duty cycle of the first synchronous rectifier FET and the second synchronous rectifier FET.

Aspect 15 includes subject matter (such as a power supply system) or can optionally be combined with one or any combination of Aspects 1-14 to include such subject matter, comprising a first supply rail, a second supply rail, and a voltage converter circuit including: a full bridge converter circuit coupled to the first supply rail and including a plurality of primary switches, an isolation transformer, an inductor coupled to the isolation transformer, a rectifier circuit, and a clamp circuit. The rectifier circuit is coupled to the second supply rail and the inductor, and isolated from the full bridge converter circuit by the isolation transformer, wherein the rectifier circuit is configured to receive energy from the full bridge converter circuit and provide energy to the full bridge converter circuit. The clamp circuit is coupled to the inductor and configured to provide a reset voltage to the inductor that prevents runaway of inductor current of the inductor.

In Aspect 16, the subject matter of Aspect 15 optionally includes a rectifier circuit including a plurality of synchronous rectifier switches, and the clamp circuit includes a plurality of clamp switches and a plurality of clamp capacitors, wherein each clamp capacitor of the plurality of clamp capacitors is coupled to the clamp switches and to the inductor, and each clamp switch is coupled to a synchronous rectifier switch.

In Aspect 17, the subject matter of one or both of Aspects 15 and 16 optionally includes a rectifier circuit including a full wave rectifier circuit topology.

In Aspect 18, the subject matter of one or any combination of Aspects 15-17 optionally includes a voltage converter circuit configured to operate to convert voltage in a forward mode and in a reverse mode, and when in the forward mode a voltage of the first supply rail is higher than a voltage of the second supply rail, and in the reverse mode the voltage of the second supply rail is higher or lower than the voltage of the first supply rail.

In Aspect 19, the subject matter of Aspect 18 optionally includes a rectifier circuit including a plurality of synchronous rectifier switches, and the clamp circuit includes at least one clamp capacitor coupled to the inductor, and when voltage converter operates in the reverse mode and the voltage of the second supply rail is higher than the voltage of the first supply rail, the inductor current increases and the energy stored in the inductor and the energy stored in the at least one clamp capacitor flow to the primary circuit side when the at least one synchronous rectifier switch is on, and the inductor current decreases and the energy stored in the inductor flows to the at least one clamp capacitor when the at least one synchronous rectifier switch is off.

In Aspect 20, the subject matter of one or any combination of Aspects 15-19 optionally includes a rectifier circuit includes a plurality of synchronous rectifier switches, and a clamp circuit including a first clamp field effect transistor (FET) and a second clamp FET, and the plurality of synchronous rectifier switches include first and second synchronous rectifier switches. A first source or drain region of the first clamp FET is connected to a first source or drain region of the second clamp FET, a second source or drain region of the first clamp FET is connected to the second synchronous rectifier switch, and a second source or drain region of the second clamp FET is connected to the first synchronous rectifier switch.

These non-limiting Aspects can be combined in any permutation or combination. The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A bidirectional power converter circuit, the bidirectional power converter circuit comprising:
   a primary circuit side including a plurality of primary switches connected to a primary side input/output terminal;
   an isolation transformer including a primary winding and a secondary winding; and
   a secondary circuit side separated from the primary circuit side by the isolation transformer and connected to a secondary side input/output terminal, wherein the secondary circuit side includes:
      an inductor including a first terminal connected to the secondary winding and a second terminal connected to the secondary side input/output terminal;
      a rectifier circuit coupled to the inductor and configured to receive energy from the primary circuit side and provide energy to the primary circuit side wherein the rectifier circuit includes first and second synchronous rectifier switches; and
      a clamp circuit coupled to the inductor and configured to provide a reset voltage to the inductor that prevents inductor current runaway, wherein the clamp circuit includes
      first and second clamp capacitors directly connected to the second terminal of the inductor and first and second clamp switches each coupled to the first and second clamp capacitors;
      wherein a first terminal of the first clamp switch is directly connected to a first terminal of the second clamp switch;
      wherein a second terminal of the first clamp switch is directly connected to the second synchronous rectifier switch, and a second terminal of the second clamp switch is directly connected to the first synchronous rectifier switch;
      wherein the first clamp capacitor is coupled to the first clamp switch and the second clamp capacitor is coupled to the second clamp switch;
      wherein the first clamp capacitor is charged from the inductor when the second clamp switch and second synchronous rectifier switch are off, and the first clamp capacitor is discharged when the first clamp switch is on; and wherein the second clamp capacitor is charged from the inductor when the first clamp switch and the first synchronous rectifier switch are off, and the second clamp capacitor is discharged when the second clamp switch is on.

2. The bidirectional power converter circuit of claim 1, wherein the primary circuit side includes a full bridge converter circuit topology, and the rectifier circuit includes a full wave rectifier circuit topology.

3. The bidirectional power converter circuit of claim 1, wherein the bidirectional power converter circuit is configured to operate to convert voltage in a forward mode and in a reverse mode, and when in the forward mode an input voltage of the primary circuit side is higher than an output voltage of the secondary circuit side, and in the reverse mode an input voltage of the secondary circuit side is higher or lower than an output voltage of the primary circuit side.

4. The bidirectional power converter circuit of claim 3,
wherein when the bidirectional power converter circuit operates in the reverse mode and the input voltage of the secondary input side is higher than the output voltage of the primary circuit side, the inductor current increases and energy stored in the inductor and at least one clamp capacitor of the first and second clamp capacitors flows to the primary circuit side when at least one of the first and second synchronous rectifier switches is on, and the inductor current decreases and the energy stored in the inductor flows to the at least one clamp capacitor when the at least one synchronous rectifier switch is off.

5. The bidirectional power converter circuit of claim 1,
wherein the first clamp switch is a first clamp field effect transistor (FET) and the second clamp switch is a second clamp FET.

6. A method of operating a bidirectional power converter circuit having a primary circuit side separated from a secondary circuit side by a transformer, the method comprising:
operating the bidirectional power converter circuit in a reverse buck mode in which an input voltage of the secondary circuit side is higher than an output voltage of the primary circuit side and energy is provided from an inductor of the secondary circuit side to the primary circuit side, wherein the inductor includes a first terminal coupled to the transformer and a second terminal coupled to an input of the secondary circuit side;
operating a rectifier circuit of the secondary circuit side having a first synchronous rectifier switch and a second synchronous rectifier switch; and
resetting a voltage of the inductor in the reverse buck mode to limit inductor current to prevent runaway of inductor current of the inductor,
wherein limiting the inductor current includes charging a first clamp capacitor directly connected to the second terminal of the inductor when a first clamp switch directly connected to the first clamp capacitor is on and the second synchronous rectifier switch is on, discharging the first clamp capacitor when the first clamp switch is off and the first synchronous rectifier switch is on, charging a second clamp capacitor directly connected to the second terminal of the inductor when a second claim switch directly connected to the first and second clamp capacitors is on and the second synchronous rectifier switch is on, and discharging the second clamp capacitor when the second clamp switch is off and the second synchronous rectifier switch is on; and wherein an activation signal of the first clamp switch is complementary to an activation signal of the second synchronous rectifier switch, and an activation signal of the second clamp switch is complementary to an activation signal of the first synchronous rectifier switch.

7. The method of claim 6,
wherein the limiting the inductor current includes decreasing the inductor current and charging one of the first and second clamp capacitors using energy stored in the inductor when one of the first and second synchronous rectifier switch is off.

8. The method of claim 6, wherein the limiting the inductor current further includes charging one of the first and second clamp capacitors when one of the first and second clamp switches is on and discharging the one of the first and second clamp capacitors when one of the first and second clamp switches is off.

9. The method of claim 6,
wherein the first synchronous rectifier switch is a first synchronous rectifier field effect transistor (FET) and the second synchronous rectifier switch is a second synchronous rectifier FET.

10. The method of claim 9, wherein the operating the bidirectional power converter circuit in the reverse buck mode includes operating a full bridge converter circuit of the primary circuit side.

11. The method of claim 9, further including transitioning the bidirectional power converter circuit from the reverse buck mode to a reverse boost mode by changing a duty cycle of the first synchronous rectifier FET and the second synchronous rectifier FET.

12. A power supply system, the system comprising:
a first supply rail and a second supply rail; and
a voltage converter circuit including:
a full bridge converter circuit coupled to the first supply rail and including a plurality of primary switches;
an isolation transformer including a primary winding and a secondary winding;
an inductor including a first terminal coupled to the secondary winding of the isolation transformer and a second terminal coupled to the second supply rail;
a rectifier circuit coupled to the second supply rail and the inductor, and isolated from the full bridge converter circuit by the isolation transformer, wherein the rectifier circuit includes first and second synchronous rectifier switches and is configured to receive energy from the full bridge converter circuit and provide energy to the full bridge converter circuit; and
a clamp circuit coupled to the inductor and configured to provide a reset voltage to the inductor that prevents runaway of inductor current of the inductor, wherein the clamp circuit includes;
first and second clamp capacitors directly connected to the second terminal of the inductor and first and second clamp switches each coupled to the first and second clamp capacitors;
wherein a first terminal of the first clamp switch is directly connected to a first terminal of the second clamp switch;
wherein a second terminal of the first clamp switch is directly connected to the second synchronous rectifier switch, and a second terminal of the second clamp switch is directly connected to the first synchronous rectifier switch;

wherein the first clamp capacitor is coupled to the first clamp switch and the second clamp capacitor is coupled to the second clamp switch;

wherein the first clamp capacitor is charged from the inductor when the second clamp switch and second synchronous rectifier switch are off, and the first clamp capacitor is discharged when the first clamp switch is on; and wherein the second clamp capacitor is charged from the inductor when the first clamp switch and the first synchronous rectifier switch are off, and the second clamp capacitor is discharged when the second clamp switch is on.

13. The system of claim 12, wherein the rectifier circuit includes a full wave rectifier circuit topology.

14. The system of claim 12, wherein the voltage converter circuit is configured to operate to convert voltage in a forward mode and in a reverse mode, and when in the forward mode a voltage of the first supply rail is higher than a voltage of the second supply rail, and in the reverse mode the voltage of the second supply rail is higher or lower than the voltage of the first supply rail.

15. The system of claim 14, wherein when the voltage converter circuit operates in the reverse mode and the voltage of the second supply rail is higher than the voltage of the first supply rail, the inductor current increases and the energy stored in the inductor and the energy stored in at least one clamp capacitor of the first and second clamp capacitors flows to the full bridge converter circuit when at least one synchronous rectifier switch of the first and second synchronous rectifier switches is on, and the inductor current decreases and the energy stored in the inductor flows to the at least one clamp capacitor when the at least one synchronous rectifier switch is off.

16. The system of claim 12, wherein the first clamp switch is a first clamp field effect transistor (FET) and the second clamp switch is a second clamp FET.

* * * * *

UNITED STATES PATENT AND TRADEMARK OFFICE
CERTIFICATE OF CORRECTION

| | |
|---|---|
| PATENT NO. | : 11,804,782 B2 |
| APPLICATION NO. | : 17/587256 |
| DATED | : October 31, 2023 |
| INVENTOR(S) | : Gu et al. |

It is certified that error appears in the above-identified patent and that said Letters Patent is hereby corrected as shown below:

On the Title Page

Item (71), in "Applicant", in Column 1, Line 1, delete "DE" and insert --MA-- therefor In the Claims In Column 8, Line 50, in Claim 1, after "includes", insert --:--

In Column 9, Line 65, in Claim 6, delete "claim" and insert --clamp-- therefor

In Column 10, Line 13, in Claim 7, delete "switch" and insert --switches-- therefor In Column 10, Line 55, in Claim 12, delete "includes;" and insert --includes:-- therefor Signed and Sealed this
Fourth Day of February, 2025

Coke Morgan Stewart
*Acting Director of the United States Patent and Trademark Office*